US011228489B2

(12) United States Patent
Margoor et al.

(10) Patent No.: US 11,228,489 B2
(45) Date of Patent: Jan. 18, 2022

(54) SYSTEM AND METHODS FOR AUTO-TUNING BIG DATA WORKLOADS ON CLOUD PLATFORMS

(71) Applicants: Amogh Margoor, Sunnyvale, CA (US); Rajat Venkatesh, Bengaluru (IN)

(72) Inventors: Amogh Margoor, Sunnyvale, CA (US); Rajat Venkatesh, Bengaluru (IN)

(73) Assignee: QUBOLE, INC., Santa Clara, CA (US)

( * ) Notice: Subject to any disclaimer, the term of this patent is extended or adjusted under 35 U.S.C. 154(b) by 0 days.

(21) Appl. No.: 16/102,852

(22) Filed: Aug. 14, 2018

(65) Prior Publication Data
US 2019/0229992 A1 Jul. 25, 2019

Related U.S. Application Data

(60) Provisional application No. 62/620,543, filed on Jan. 23, 2018.

(51) Int. Cl.
H04L 12/24 (2006.01)
H04L 29/08 (2006.01)
(Continued)

(52) U.S. Cl.
CPC ........ *H04L 41/0823* (2013.01); *G06F 16/217* (2019.01); *G06F 16/27* (2019.01);
(Continued)

(58) Field of Classification Search
CPC . H04L 41/0823; H04L 41/12; H04L 41/5003; H04L 67/1002; H04L 67/1097; G06F 16/27; G06F 16/217
(Continued)

(56) References Cited

U.S. PATENT DOCUMENTS 5,603,001 A 2/1997 Sukegawa et al.
5,907,675 A 5/1999 Aahlad
(Continued)

FOREIGN PATENT DOCUMENTS

EP 1117039 A3 9/2005
EP 2615803 A2 7/2013
WO 2014138745 A3 12/2014

OTHER PUBLICATIONS

Wikipedia, Optimization (computer science), Mar. 4, 2016, https://simple.wikipedia.org/w/index.php?title=Optimization_(computer_science)&oldid=5343923 (Year: 2016).*
(Continued)

*Primary Examiner* — James E Springer
(74) *Attorney, Agent, or Firm* — Landmark Intellectual Property Law; Gregory M Murphy

(57) ABSTRACT

The invention is generally directed to systems and methods of automatically tuning big data workloads across various cloud platforms, the system being in communication with a cloud platform and a user, the cloud platform including data storage and a data engine. The system may include: a system information module in communication with the cloud platform; a static tuner in communication with the system information module; a cloud tuner in communication with the static tuner and the user; and an automation module in communication with the cloud tuner. Methods may include extracting information impacting or associated with the performance of the big data workload from the cloud platform; determining recommendations based at least in part on the information extracted; iterating through different hardware configurations to determine optimal hardware and data engine configuration; and applying the determined configuration to the data engine.

21 Claims, 2 Drawing Sheets

(51) Int. Cl.
*G06F 16/21* (2019.01)
*G06F 16/27* (2019.01)

(52) U.S. Cl.
CPC .......... *H04L 41/12* (2013.01); *H04L 41/5003* (2013.01); *H04L 67/1002* (2013.01); *H04L 67/1097* (2013.01)

(58) Field of Classification Search
USPC ....................................................... 709/226
See application file for complete search history.

(56) References Cited

U.S. PATENT DOCUMENTS

| | | |
|---|---|---|
| 6,192,391 B1 | 2/2001 | Ohtani |
| 6,460,027 B1 | 10/2002 | Cochrane et al. |
| 6,601,062 B1 | 7/2003 | Deshpande et al. |
| 6,847,962 B1 | 1/2005 | Cochrane et al. |
| 7,680,994 B2 | 3/2010 | Buah et al. |
| 7,844,853 B2 | 11/2010 | Barsness et al. |
| 7,848,261 B2 | 12/2010 | Fachan |
| 8,260,840 B1 | 9/2012 | Sirota et al. |
| 8,296,419 B1 | 10/2012 | Khanna et al. |
| 8,996,482 B1 | 3/2015 | Singh et al. |
| 9,049,746 B2 | 6/2015 | Periyalwar et al. |
| 9,451,013 B1 | 9/2016 | Roth et al. |
| 9,483,785 B1 | 11/2016 | Corley et al. |
| 9,531,607 B1 | 12/2016 | Pai et al. |
| 9,571,561 B2 | 2/2017 | Jang |
| 9,645,859 B1 | 5/2017 | Dash et al. |
| 9,860,569 B1 | 1/2018 | Wilms et al. |
| 10,069,693 B1 | 9/2018 | Daptardar et al. |
| 2002/0145983 A1 | 10/2002 | Block et al. |
| 2002/0157113 A1 | 10/2002 | Allegrezza |
| 2003/0005350 A1 | 1/2003 | Koning et al. |
| 2003/0065874 A1 | 4/2003 | Marron et al. |
| 2004/0193626 A1 | 9/2004 | Colby et al. |
| 2005/0222996 A1 | 10/2005 | Yalamanchi |
| 2005/0278387 A1 | 12/2005 | Kamada et al. |
| 2007/0094290 A1 | 4/2007 | Oka et al. |
| 2007/0195810 A1 | 8/2007 | Fachan |
| 2007/0294493 A1 | 12/2007 | Buah et al. |
| 2008/0141065 A1 | 6/2008 | Okabe |
| 2009/0043873 A1 | 2/2009 | Bareness et al. |
| 2009/0182779 A1 | 7/2009 | Johnson |
| 2009/0222418 A1 | 9/2009 | Layman |
| 2009/0327854 A1 | 12/2009 | Chhajer et al. |
| 2010/0153482 A1 | 6/2010 | Kim et al. |
| 2010/0306286 A1 | 12/2010 | Chiu et al. |
| 2011/0119449 A1 | 5/2011 | Neerincx et al. |
| 2011/0167221 A1* | 7/2011 | Pangal ................... G06F 3/065 711/117 |
| 2011/0314485 A1 | 12/2011 | Abed |
| 2012/0047339 A1 | 2/2012 | Decasper et al. |
| 2012/0102291 A1 | 4/2012 | Cherian et al. |
| 2012/0151272 A1 | 6/2012 | Behrendt et al. |
| 2012/0215763 A1 | 8/2012 | Hughes et al. |
| 2012/0304192 A1 | 11/2012 | Grove et al. |
| 2013/0110764 A1 | 5/2013 | Wilf |
| 2013/0124483 A1 | 5/2013 | Furuhashi et al. |
| 2013/0132967 A1 | 5/2013 | Soundararajan et al. |
| 2013/0179881 A1 | 7/2013 | Calder et al. |
| 2013/0189969 A1 | 7/2013 | Periyalwar et al. |
| 2013/0204948 A1 | 8/2013 | Zeyliger et al. |
| 2013/0227558 A1 | 8/2013 | Du et al. |
| 2013/0232254 A1* | 9/2013 | Srikanth ............. H04L 43/0817 709/224 |
| 2013/0254171 A1 | 9/2013 | Grondin et al. |
| 2013/0290771 A1 | 10/2013 | Kim et al. |
| 2013/0318379 A1 | 11/2013 | Seshadri et al. |
| 2013/0332612 A1 | 12/2013 | Cai et al. |
| 2014/0040575 A1 | 2/2014 | Horn |
| 2014/0059306 A1 | 2/2014 | Bender et al. |
| 2014/0059552 A1 | 2/2014 | Cunningham et al. |
| 2014/0067992 A1 | 3/2014 | Saeki |
| 2014/0095505 A1 | 4/2014 | Blanchflower et al. |
| 2014/0149590 A1 | 5/2014 | Mallipeddi et al. |
| 2014/0156777 A1 | 6/2014 | Subbiah et al. |
| 2014/0189109 A1 | 7/2014 | Jang |
| 2014/0195558 A1* | 7/2014 | Murthy ................ G06F 16/951 707/770 |
| 2014/0279838 A1 | 9/2014 | Tsirogiannis et al. |
| 2015/0222705 A1 | 8/2015 | Stephens |
| 2015/0234688 A1 | 8/2015 | Dageville et al. |
| 2015/0242197 A1 | 8/2015 | Alfonso et al. |
| 2015/0379026 A1 | 12/2015 | Todd et al. |
| 2016/0065627 A1 | 3/2016 | Pearl et al. |
| 2016/0179581 A1 | 6/2016 | Soundararajan et al. |
| 2016/0224638 A1 | 8/2016 | Bestler et al. |
| 2016/0350371 A1 | 12/2016 | Das et al. |
| 2016/0371193 A1 | 12/2016 | Floratou et al. |
| 2017/0337138 A1* | 11/2017 | Li ....................... G06F 12/0246 |
| 2018/0159727 A1* | 6/2018 | Liu ..................... H04L 41/0806 |

OTHER PUBLICATIONS

Merriam-Webster, Definition of Optimization, Mar. 16, 2016, https://web.archive.org/web/20160316041232/https://www.merriam-webster.com/dictionary/optimization (Year: 2016).*

Alipourfard et al., CherryPick: Adaptively Unearthing the Best Cloud Configurations for Big Data Analytics, Mar. 29, 2017, USENIX, https://www.usenix.org/system/files/conference/nsdi17/nsdi17-alipourfard.pdf (Year: 2017).*

International Search Report for PCT/US2015/045419 completed Oct. 2, 2015; 2 pages.

International Search Report for PCT/US2015/050174 completed Nov. 16, 2015; 2 pages.

International Search Report for PCT/US2015/057003 completed Dec. 13, 2015; 2 pages.

* cited by examiner

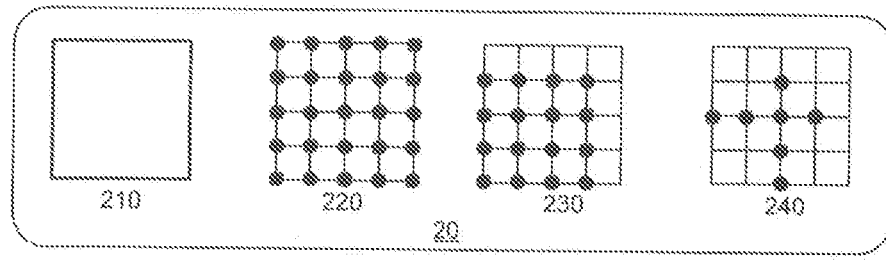
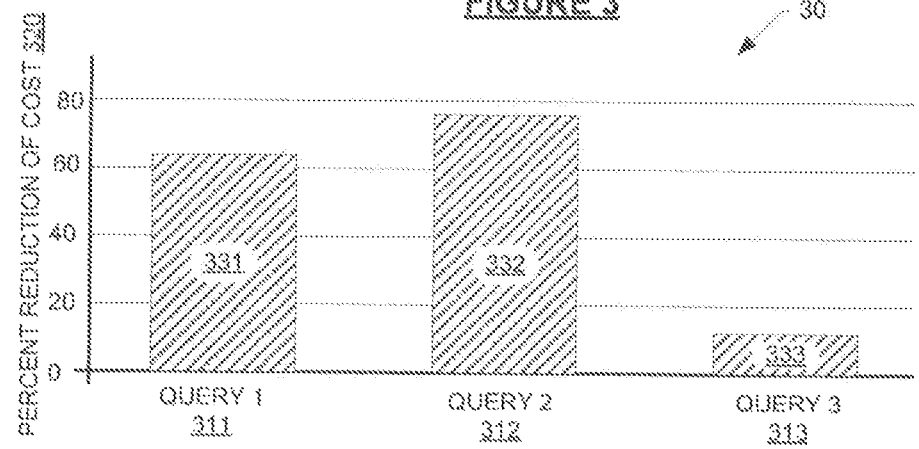
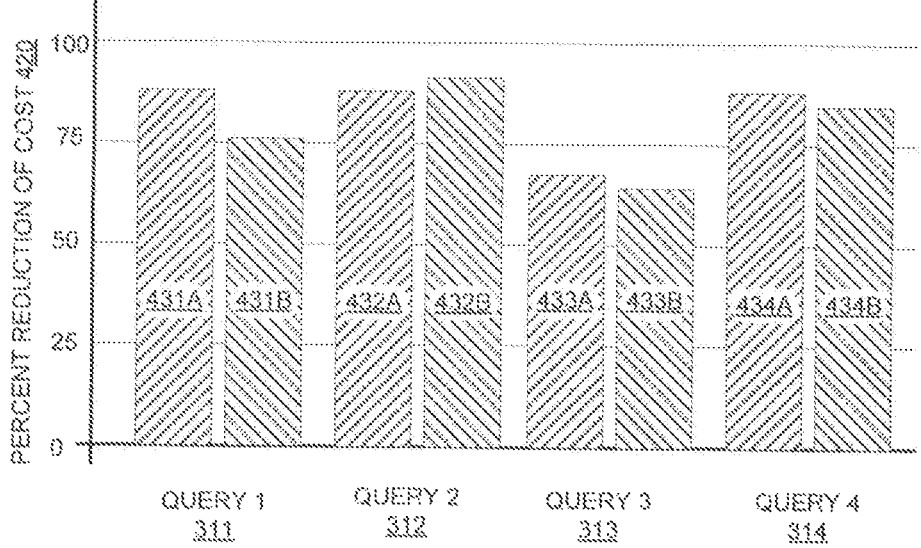

SYSTEM AND METHODS FOR AUTO-TUNING BIG DATA WORKLOADS ON CLOUD PLATFORMS

RELATED APPLICATIONS/FIELD OF THE INVENTION

This application claims priority to U.S. Provisional Patent Application No. 62/620,543, filed on 23 Jan. 2018, entitled "Systems and Methods for Auto-Tuning Big Data Workloads on Cloud Platforms," which is incorporated herein by reference in its entirety. In general, the preset invention is directed to systems and methods that may provide a common abstraction layer to tune various modules of a big data engine, data set and workloads on cloud platforms. More specifically, the present invention may automatically tune such modules to improve cost, decrease cost or both.

BACKGROUND

The term "Big Data" generally refers to a collection of data sets that may be difficult to process using traditional data processing applications due to its size and/or complexity. Due to its size, processes to capture, process, manage, and/or curate the data within a reasonable time may be quite difficult. Big Data has been defined to include a high volume of data, high velocity processing speed, high variety of information, and high veracity or accuracy of information and analytics.

Big Data may be utilized in virtually any service or product. Ranging from science and research applications (such as, for example, data collected by the Large Hadron Collider, or information related to the human genome) to those in everyday life (such as, for example, services provided by Facebook, Amazon, eBay), the ability to process Big Data and determine meaningful conclusions therefrom is becoming a necessity.

As Big Data has grown, computing resources necessary to efficiently handle such data is required. Due to certain constraints—ranging from cost to physical space—cloud computing has provided resources that can be tapped in order to process Big Data. Big Data systems may be quite powerful and may process petabytes of data and run on upwards of thousands of machines. However, there are periods when such systems are underutilized and other periods when such systems are over-taxed. Accordingly, it is desirable to have a Big Data system that can be adapt to workload and scale up and down, thereby leading to better utilization of resources and reducing costs.

Cloud computing has what can be referred to as an elastic property, in that virtual machines in the cloud can be used on-demand on an as-needed basis, thereby providing resources that are suitable for specific processing tasks or functions. However, the flexibility of resources in a cloud computing environment can be difficult to control. Determining the proper amount of resources at the outset of an activity can be difficult, particularly when the loads of certain applications fluctuate.

In a large-scale cloud computing environment, the use of various processing and computing resources may be available at a certain cost rate. There is often a balance between the cost of resources and optimal performance. In some situations, cloud computing products or services may be offered to provide better financial rates, but with certain drawbacks. Accordingly, a large-scale cloud processor may seek to either rectify or mitigate drawbacks to obtain optimal performance at desirable rates.

Due to various reasons (including, but not limited to, costs, availability, efficiency, speed, and/or other attributes) companies may be running Big Data workloads on various cloud platforms. Configuration tuning of these data engines is an important but difficult undertaking. Cloud platforms may further add to this complexity due to elasticity of compute resources and availability of different machine types. Data engineers often have to choose the correct machine type and number of machines along with the other configuration options.

For example, execution engines such as Map Reduce (M/R), Tez, Presto, and/or Spark may provide a set of knobs or configuration parameters that control the behavior of the execution engine. Accordingly, it is desirable to determine a good set of parameters for SQL workloads amongst different engines. However, it may be tricky to identify an optimal, or even a good, set of parameters for a specific workload. The list of parameters is long and many of the parameters are correlated in unexpected ways. For example, in M/R, mapper memory and input split size are correlated since a good value for the memory parameter may depend on the split size.

Typically, an "Extract, Transform, and Load" (ETL) engineer will determine a set of parameters after analyzing a few important workloads. However, these parameters may not be optimal for all workloads. Moreover, as the queries and data change, parameters determined at one point in time may not be optimal over time. An automated approach that can recommend an optimal set of configuration values for each workload is desirable and may present a scalable option.

Accordingly, an auto-tuning framework is desirable. Specifically desirable is an auto-tuning system framework that may include one or more attributes of: (i) collecting relevant metrics from the data engine; collecting relevant statistics from the data sets; (iii) collecting relevant workload properties; (iv) recommending changes that may use rule-based, cost-based, and/or machine learning based algorithms to generate tuning recommendations; (v) applying recommendations to the data engine; (vi) applying recommendations to the data set; (vii) applying recommendations to the workload; and/or (viii) receiving information from the cloud platform. The present invention provides such desirable attributes.

SUMMARY OF THE INVENTION

In accordance with some embodiments of the present invention, aspects may include a system for automatically tuning big data workloads across various cloud platforms, the system being in communication with a cloud platform and a user, the cloud platform including data storage and a data engine, the system comprising: a system information module in communication with the cloud platform: a static tuner in communication with the system information module; a cloud tuner in communication with the static tuner and the user; and an automation module in communication with the cloud tuner.

In accordance with some embodiments of the present invention, aspects may include a method for automatically tuning big data workloads across various cloud platforms, the method being applied across different cloud platforms, data models, and data storage formats, the method utilizing a tuning module in communication with a cloud platform and a user, the cloud platform including data storage and a data engine, the method comprising: extracting information from the cloud platform, the information impacting or associated with the performance of the big data workload;

determining recommendations based at least in part on the information extracted from the cloud platform; iterating through different valid hardware configurations to determine desired or optimal hardware and data engine configuration; and applying the determined desired or optimal hardware and data engine configuration to the data engine.

These and other aspects will become apparent from the following description of the invention taken in conjunction with the following drawings, although variations and modifications may be affected without departing from the spirit and scope of the novel concepts of the invention

DESCRIPTION OF THE DRAWINGS

The present invention can be more fully understood by reading the following detailed description together with the accompanying drawings, in which like reference indicators are used to designate like elements. The accompanying figures depict certain illustrative embodiments and may aid in understanding the following detailed description. Before any embodiment of the invention is explained in detail, it is to be understood that the invention is not limited in its application to the details of construction and the arrangements of components set forth in the following description or illustrated in the drawings. The embodiments depicted are to be understood as exemplary and in no way limiting of the overall scope of the invention. Also, it is to be understood that the phraseology and terminology used herein is for the purpose of description and should not be regarded as limiting. The detailed description will make reference to the following figures, in which:

FIG. 2 depicts an exemplary iterative algorithm for determining optimal values for certain parameters, in accordance with some embodiments of the present invention.

FIG. 3 illustrates an exemplary chart, showing reduction of query cost, in accordance with some embodiments of the present invention.

FIG. 4 illustrates an exemplary chart, showing predicted reduction in cost compared with observed reduction in cost, in accordance with some embodiments of the present invention.

Figure 1:
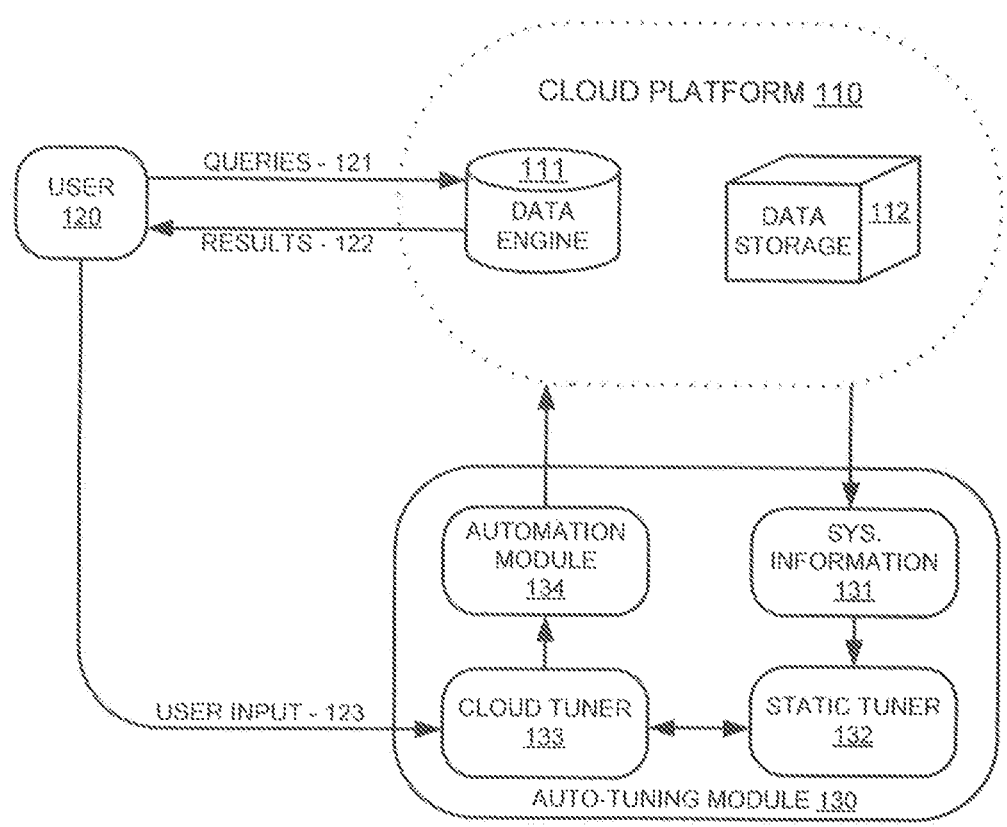
FIG. 1 illustrates an exemplary arrangement of system components for auto-tuning big data workloads on cloud platforms, in accordance with some embodiments of the present invention.

Before any embodiment of the invention is explained in detail, it is to be understood that the present invention is not limited in its application to the details of construction and the arrangements of components set forth in the following description or illustrated in the drawings. The present invention is capable of other embodiments and of being practiced or being carried out in various ways. Also, it is to be understood that the phraseology and terminology used herein is for the purpose of description and should not be regarded as limiting.

DETAILED DESCRIPTION OF THE INVENTION

The matters exemplified in this description are provided to assist in a comprehensive understanding of variety exemplary embodiments disclosed with reference to the accompanying figures. Accordingly, those of ordinary skill in the art will recognize that various changes and modifications of the exemplary embodiments described herein can be made without departing from the spirit and scope of the claimed invention. Descriptions of well-known functions and constructions are omitted for clarity and conciseness. Moreover, as used herein, the singular may be interpreted in the plural, and alternately, any term in the plural may be interpreted to be in the singular.

The present invention is directed to systems and methods that may provide a common abstraction layer to tune various modules of a big data engine, data set and workloads on cloud platforms. More specifically, the present invention may automatically tune such modules to improve cost, decrease cost or both. In providing such systems and methods, some embodiments of the present invention may determine a good or optimal set of parameters for SQL workloads amongst different engines. Some embodiments of the present invention may provide scalable systems and methods that may recommend an optimal set of configuration values for each workload.

As noted above, some embodiments of the present invention may comprise an auto-tuning system framework that may include one or more attributes of: (i) collecting relevant metrics from the data engine; collecting relevant statistics from the data sets; (iii) collecting relevant workload properties; (iv) recommending changes that may use rule-based, cost-based, and/or machine learning based algorithms to generate tuning recommendations; (v) applying recommendations to the data engine; (vi) applying recommendations to the data set; (vii) applying recommendations to the workload; and/or (viii) receiving information from the cloud platform.

Note that the present invention is agnostic as to the specific cloud platform, big data engine, and/or workload data. In other words, while recommendations may consider the dynamism of cloud platforms, the specific identity of cloud platforms (AWS, Microsoft Azure, Google Cloud, etc.) is not a determining factor and other cloud platforms not discussed may be used by the present invention. Similarly, while big data engines such as Apache Hive, Apache Tez, Apache Spark, and Presto are discussed, it is contemplated that systems and methods of the present invention are not limited to specific data engines, and instead can be utilized with various big data engines either not listed here, or not yet in use. The specific attributes of the big data engine—while relevant to the determination of optimal tuning—do not bear directly on the present invention. Workloads discussed may include ETL, ad-hoc, reporting, data science, and AI data, other workloads and datasets may be used.

Recommendations of auto-tuning may include number of machines, machine type and/or the machine life cycle policy. Examples of machine life cycle policies may include, but are not limited to, preemptible, spot-nodes, spot blocks, on-demand.

With reference to FIG. 1, an exemplary system 100 of auto-tuning big data workloads on cloud platforms will now be discussed. System 100 generally comprises three (3) elements: cloud platform 110, user 120, and auto-tuning module 130.

Cloud platform 110 may comprise a data engine 111 and a data storage 112. The user 120 may interact with the data engine 111 to, for example, send query requests 121 to the data engine 111, and receive results 122 from the data engine 111.

Auto-tuning module 130 may comprise a system information submodule 131, static tuner 132, a cloud tuner 133, and an automation sub-module 134. The system information sub-module 131 may receive information from the cloud platform 110 and send information to the static tuner 132. Static tuner 132 may be in communication with cloud tuner 153, which may also receive inputs 123 from user 120. Cloud tuner 133 may send information to the automation sub-module 134, which in turn may convey information back to the cloud platform 110.

More specifically, the system information sub-module 131 may gather information such as, but not limited to: SQL queries; machine learning jobs; data processing jobs written in Map-Reduce, Scala, Pig etc.; metadata, such as table and/or column data; system metrics, for example associated with CPUs, networks, etc.; data engine metrics, such as the number of tasks pending or processing, spills, attempts, etc.; cloud hardware information, such as machine configuration, billing policies, etc.; inventory of compute resources provided by the cloud platform like machine types; price per unit of compute resources; and/or policies to control budget and service level agreements (SLAs) from administrators.

Each of the cloud platforms, engines, data sets and workloads may provide an interface to extract this information. A data warehouse may be used to store this information. The data warehouse may support both real time as well as batch analysis.

The static tuner 132 may use data captured by the system information sub-module 131. The input and recommendation may depend at least in part on the sub-system of the data engine. For example, for data modeling, the input may be queries and metadata. Recommendations may then be generated using one or more of: (i) heuristics or known industry best practices (for example, data partitioning); (ii) cost-based (for example, using sort or bucket data); and/or (iii) machine learning techniques, which may for example be used to find, identify, or determine optimal engine settings. Algorithms used by the static tuner 132 may utilize historical data of usage, metrics and configuration of the big data engine captured and stored in the system information sub-module.

The cloud tuner 133 may use the static tuner 132 and policies to iterate through valid hardware configurations and determine desired or optimal hardware and data engine configuration. The static tuner 132 and cloud tuner 133 may also manage policies for current recommendations. For example, if materialized views are recommended and there is a storage or freshness of data constraint, then the materialized view may be refreshed as per policy. The cloud tuner 133 may implement algorithms to tune the database by considering factors that may include, but are not limited to, the following: (i) size of cluster, (ii) machine types for one or more clusters; (iii) storage policies and cost; and/or (iv) network topology of one or more clusters.

Since the number of possible hardware configurations is very high, the system may utilize heuristics to reduce the number of hardware configurations considered by the algorithms. These heuristics may be defined as policies provided by experts in the field and may be used as another input to the system. Some heuristics in accordance with some embodiments of the present invention are discussed below.

The automation submodule 134 may apply the recommendation on the data engine 111. This may be accomplished automatically or through direct or indirect user instruction. The automation submodule may desire or require changes to current engines 111 to accept a new hardware configuration and/or use the application programming interface (API) of a cloud platform to modify or alter hardware on a live data engine installation with acceptable, little, or no down time.

Note that it is contemplated that systems in accordance with some embodiments of the present invention may include additional components. For example, system 10 may further comprise a module to recognize queries failing due to run time errors and implementing a fix to prevent this error. Similarly, if a query is repetitive, the performance or cost of the query may be iteratively improved.

Optimization Techniques. As noted above, there are various optimization techniques that may be used in auto-tuning algorithms. Such techniques may be applied to various modules in a data engine, including an overall data model, execution engine, clusters, and/or storage. Optimization in each of these modules is discussed in turn.

With regard to data models, note that data operations may be optimized by storing data using specific data structures. In database industries, this feature is typically called materialized views. Note that while multiple materialized views can be created, available storage is often a limiting factor or main consideration. When a storage layer can expand to any capacity, considerations may turn to the cost of storage. The present invention may provide operational support to keep cost under control as per policies determined by the administrator. The data model recommended by some embodiments of the present invention may use queries run and metadata to provide following recommendations: (i) table partitions; (ii) sort columns; (iii) denormalized or pre-joined tables; and/or (iv) narrow tables.

With regard to execution engines, in typical installations machine and resource configuration may be substantially or practically static. However, in dynamic environments the number of machines and resources (such as but not limited to CPU, memory, network, disk, etc.) may vary. Accordingly, a similar or even same job across different installations or environments may require different configurations. The execution engine recommender may recommend: (i) machine type; (ii) number of nodes; and/or (iii) configuration parameters, such as split size, number of reducers, container size, etc.

Cluster management may determine the composition in terms of number of machines and machine types. Factors that may be considered may include workload and billing or cost policies. In accordance with some embodiments of the present invention, the cluster management recommender may recommend: (i) spot node policy; and/or (ii) heterogeneous machine composition.

With regard to storage models, note that in public clouds, data tiering may be an important feature (for example, to reduce latency). The storage layers available are object store, SAN, local disk and memory. However, the data to store each layer of storage may be difficult to control and determine. The storage recommender may determine which tables, columns, and/or partitions will reside in various layers.

Optimization Approaches/Methodologies. In general, an optimization function should be a function of dollar cost and throughput. It is observed that administrators often focus on only one of these functions, often resulting in sub-optimal configurations. For example, execution engine configuration is sub-optimal in the field. In nearly every experiment performed by the inventors, a large fraction of the queries could be optimized by more than sixty percent (60%). This points to the fact that, in most cases, manual efforts to choose optimal configuration fail.

Moreover, while optimal configuration could be determined by running a workload iteratively with different values, this method is expensive and impractical. However, a model of an execution engine may provide recommendations for SQL workloads without requiring actual execution. As noted above, such models may be used in various engines, including but not limited to Map Reduce, Tez, Presto, and Spark, and may be used to automate and provide insights and recommendations for engine configuration.

Approaches used to determine optimal configurations may include; (i) iterative execution approaches: and (ii) mathematical models.

In an iterative execution approach, jobs may be executed multiple times with different configuration parameters to determine an optimal configuration. As the parameter space is huge, these approaches focus on techniques to converge towards a good configuration using lesser number of steps. For example, a noisy gradient may be used to converge to a solution and apply stochastic optimization to parameter tuning.

In a mathematical model approach, a mathematical model may be used to predict runtime/cost of jobs for a particular configuration. The search over the parameter space to find the optimal configuration may be performed using the model without having to actually run the job.

Examining SQL workloads that may run via Hive, Spark, Presto, etc., certain optimization methodologies were determined. First, two (2) options to search the space of configuration values were examined: iterative execution and model-based execution. The optimization function for both methodologies can be defined as:

$$\sum_{i=1}^{n} \beta_i \times \Delta_i$$

Looking at the equation above, n is the number of containers launched, $\beta_i$ is the container memory for the $i^{th}$ container launched, and $\Delta_i$ is the execution time for the $i^{th}$ container launched for job. The product is a proxy for the cost of running a container. The sum is a proxy for the cost of running a query. This represents both memory and CPU resources consumed, and may correlate to both dollar cost and throughput of a big data stack.

Next, parameters that control parallelism and memory per task were examined, as these classes of parameters may have the biggest impact on SQL workloads. For example, such parameters for Map Reduce may include, but are not limited to mapreduce.map.memory.mb, mapreduce.reduce.memory.mb, mapreduce.input.fileinputformat.split.maxsize, mapreduce.input.fileinputformat.split.minsize, and/or hive.exec.reducers.bytes.per.reducer.

Parameters for Spark may include, but are not limited to spark.executor.cores, spark.executor.memory, spark.hadoop.mapreduce.input.fileinputformat.split.maxsize, spark.hadoop.mapreduce.input.fileinputformat.split.minsize, spark.sql.shuffle.partitions, and/or spark.sql.autoBroadcastJoinThreshold.

Using an iterative execution approach, Hive queries with various configuration parameters were run, and the most optimal configuration was selected. Strategies to reduce the parameter space may include, but are not limited to: (i) parameter reduction—focus on a small(er) set of configuration parameters: (ii) discretization—by discretizing each parameter fewer values are tried, rather than all possible values for each parameter: (iii) reduce search range—although parameter may be selected from a large range of values, a search may be limited to an expected good range for each dimension using heuristics; and/or (iv) assume dimension independence—ignore dependence of parameters to prevent parameter space explosion due to correlation.

Note that as briefly mentioned above, for repetitive queries, each iteration of the query may be used to improve performance or cost.

An iterative algorithm that searched the space of configuration values based on these constraints was then performed. With reference to FIG. 2, an iterative algorithm 20 that searched the space of all configuration values based on these constraints. FIG. 2 illustrates steps to search optimal values for two parameters. Graphical representation 210 shows the search space for two parameters. Graphical representation 220 shows discrete values being explored in each axis. Graphical representation 230 illustrates the search space being restricted based on domain knowledge. Subsequently, graphical representation 240 shows an algorithm reiterating itself through each parameter, choosing an optimal point, and then moving to the next parameter.

An algorithm in accordance with some embodiments of the present invention was then run in an attempt to optimize three (3) different Hive queries. As illustrated in FIG. 3, reduction of costs using the auto-tuning processes of the present invention returned cost reductions ranging from 15% to 75%. FIG. 3 illustrates a chart 30, showing data for three different queries (311, 312, 333), depicted against a vertical axis 320 showing percentage of cost reduction. The first query 311 showed a cost reduction of approximately 65%, shown at 331. The second query 312 showed a cost reduction of approximately 75%, shown at 332. The third query 313 showed a cost reduction of approximately 15%. Again, each auto-tuned result showed significant improvement and savings over settings chosen by database administrators. However, despite cost savings, this iterative approach was run considered to be practical due to increased cost of running the approach. The high cost was a factor of both the number of queries and iterations, and the use of shadow clusters and tables in ETL queries that required multiple reviews, increasing man-hour associated costs.

Since iterative execution is impractical at scale, a model-based approach to eliminate execution of queries was examined. An execution model was created that substantially replicated an execution engine, based on a reduced set of parameters. In accordance with some embodiments of the present invention, this model may also utilize various statistics about data sizes and selectivities of various operators as input. Such statistics may be obtained by collecting metrics from a previous run, or by using statistics from a database catalog. Metrics from a previous run may be suitable for ETL or reporting queries, while statistics from a database catalog may be suitable for ad-hoc queries. This model outputs the result of the optimization function as described above.

To quantify the prediction error by the model, four (4) queries were processed. The graph 40 at FIG. 4 illustrates the benefit predicted by our model and the actual observed benefit for these queries. Each query (411, 412, 413, 414) is set forth along the x axis, while the y axis 420 shows the percentage of cost reduction. It can be seen that the first query 411 showed a predicted cost reduction (431A) of approximately 82%, while an observed cost reduction (431B) was approximately 76%. The second query 412 showed a predicted cost reduction (432A) of approximately 80%, while an observed cost reduction (432B) was approximately 82%. The third query 413 showed a predicted cost reduction (433A) of approximately 72%, while an observed cost reduction (433B) was approximately 70%. The fourth query 414 showed a predicted cost reduction (434A) of approximately 80%, while an observed cost reduction (434B) was approximately 78%. It can be seen that, in general, the actual savings closely match the predicted savings indicating that the model is sufficiently accurate.

Some insights and heuristics to optimize SQL workloads were gained. Some are discussed briefly below.

Insight 1: Container Shape Should Match Instance Family Shape. Yarn allocates containers on two dimensions—memory and virtual central processing unit (vcpu). Each container is given 1 vcpu and some memory. The memory/vcpu of the containers should match the memory/vcpu ratio of the machine type. Otherwise resources may be unnecessarily wasted.

Insight 2: Avoid Spills in Tasks. Spills are expensive because each spill leads to an extra write and read of all the data. Spills should be avoided at all costs. In general, spills may be avoided by providing adequate memory to each task.

Insight 3: Decrease Memory Per Task to Choose Cheaper Instance Type. (On cloud platforms, machines with higher memory/cpu are generally more expensive for the same CPU type. Decrease the memory per task and consequently increase parallelism to choose a cheaper instance type. As long as tasks do not spill, the total work done in terms of IO, CPU and network traffic is independent of the parallelism factor of the tasks. For example, the total data read and processed will be the same if the number of mappers is 100 or 1000. If a job can be tuned to avoid spills on a cheaper instance with same compute but lesser memory than original instance, then it is generally a good idea to move to cheaper instance for saving cost without any performance degradation.

Insight 4: Beware of Secondary Effects of High Parallelism. Parallelism cannot be increased indefinitely. There are secondary effects of increasing the number of tasks. For example every task has to pay the cost of Java virtual machine (JVM) start if applicable. There may also be an increase in number of communication channels. Accordingly, parallelism should be not be set so high that secondary effects drown the increase in performance. This limit is specific to a workload or query and cluster configuration and can be determined algorithmically.

Insight 5: In Spark Environments, Prefer Fat Executors. This insight is specific to Spark, where there is an additional parameter of cores per executor. Given a certain number of cores per machine, there may be a choice of either running many executors with fewer cores per executor (thin executors), or fewer executors with more cores per executor (fat executors). It has been observed that fat executors generally provide better performance, due to better memory utilization across cores, reduced number of replicas of broadcast tables, and lesser overheads due to more tasks running in the same executor process.

It will be understood that the specific embodiments of the present invention shown and described herein are exemplary only. Numerous variations, changes, substitutions and equivalents will now occur to those skilled in the art without departing from the spirit and scope of the invention. Accordingly, it is intended that all subject matter described herein and shown in the accompanying drawings be regarded as illustrative only, and not in a limiting sense.

What is claimed is:

1. A system for automatically tuning big data workloads across one or more cloud platforms, the system being in communication with a cloud platform and a user, the cloud platform including data storage and a data engine, the system comprising:

a non-transitory computer-readable medium having a computer program stored thereon for execution by one or more processors, the computer program operable to tune big data workloads;

a system information module in communication with the one or more cloud platforms;

a static tuner in communication with the system information module, the static tuner utilizing data captured by the systems information module to determine recommendations for optimizing the one or more cloud platforms;

a cloud tuner in communication with the static tuner and the user, the cloud tuner using information from the static tuner and one or more policies or rules received from the user to determine desired or optimal hardware and data engine configurations across the one or more cloud platforms; and an automation module in communication with the cloud tuner, the automation module permitting automatic optimization of the hardware and data engine configuration to tune a big data workload across the one or more cloud platforms, the automation module capable of increasing and decreasing data engine configurations to scale up or down.

2. The system of claim 1, wherein the system information module gathers information about the data workload and any associated cloud platform or data engine.

3. The system of claim 2, wherein the system information module gathers information selected from the list consisting of: structured query language (SQL) queries;

machine learning jobs; data processing jobs; metadata; system metrics; data engine metrics;

cloud hardware information; inventory of compute resources provided by the cloud platform;

price per unit of compute resources; and policies to control budget and service level agreements (SLAs) from administrators.

4. The system of claim 1, wherein the static tuner uses data captured by the systems information module to determine recommendations.

5. The system of claim 4, wherein the determined recommendations are based at least in part on historical data of usage, metrics, and configuration of the data engine, as stored in the systems information module.

6. The system of claim 1, wherein the cloud tuner determines desirable or optimal hardware and data engine configurations.

7. The system of claim 6, wherein the cloud tuner determines desirable or optimal hardware and data engine configurations based at least in part on policies to control budget and service level agreements.

8. The system of claim 6, wherein the cloud turner utilizes algorithms to tune the big data workload based at least in part upon (i) the static tuner and (ii) a size of available clusters, machine types for one or more cluster, storage policies and cost, and/or network topology of one or more clusters.

9. The system of claim 1, wherein the automation module applies the recommendations from the static tuner and the cloud tuner to the data engine.

10. The system of claim 9, wherein the automation module uses an application programming interface (API) of a cloud platform to modify hardware on a data engine.

11. The system of claim 1, wherein the cloud tuner recommends improved performance across different data models and data storage formats.

12. A method for automatically tuning big data workloads across one or more cloud platforms, the method being applied across different cloud platforms, data models, and data storage formats, the method utilizing a tuning module in communication with a cloud platform and a user, the one or more cloud platforms each including data storage and a data engine, the method comprising:
- extracting information from the one or more cloud platforms, the information impacting or associated with the performance of the big data workload across the one or more cloud platforms;
- determining recommendations based at least in part on the information extracted from the one or more cloud platforms;
- iterating through different valid hardware configurations to determine desired or optimal hardware and data engine configuration; and
- applying the determined desired or optimal hardware and data engine configuration to the data engine of each of the one or more cloud platforms, scaling the hardware and data engine configuration up or down.

13. The method of claim 12, further comprising storing the information extracted from the cloud platform in a data warehouse.

14. The method of claim 12, wherein determining recommendations is based at least in part on industry best practices, cost-based determinations, and/or machine learning techniques.

15. The method of claim 14, wherein the machine learning techniques are used to identify optimal data engine settings, based at least in part on historical data of usage, metrics, and configuration of the data engine.

16. The method of claim 12, wherein determining desired or optimal hardware and data engine configurations is based at least in part on the size of available clusters, machine types for one or more clusters, storage policies and cost, and/or network topology of one or more clusters.

17. The method of claim 12, further comprising applying heuristics to reduce the number of hardware configurations considered during the iteration step.

18. The method of claim 12, further comprising recognizing queries failing due to run time errors.

19. The method of claim 12, wherein the determined desired or optimal hardware and data engine configuration comprises modifications to spot node policies or the use of heterogeneous machine compositions.

20. The method of claim 12, further comprising determining which tables, columns, and/or partitions reside in each layer of storage.

21. The method of claim 12, wherein applying the determined desired or optimal hardware and data engine configuration to the data engine comprises communicating with an application programming interface of the cloud platform.

* * * * *